United States Patent [19]
Bryant et al.

[11] Patent Number: 6,101,006
[45] Date of Patent: Aug. 8, 2000

[54] METHOD AND APPARATUS FOR CONTROLLING IMAGE SCANNING AND DATA TRANSFER IN A PHOTOGRAPHIC FILM SCANNER

[75] Inventors: Steven M. Bryant, Holley; Duane J. Farling, Webster, both of N.Y.

[73] Assignee: Eastman Kodak Company, Rochester, N.Y.

[21] Appl. No.: 09/134,619

[22] Filed: Aug. 14, 1998

[51] Int. Cl.[7] ................................................. H04N 1/46
[52] U.S. Cl. ........................ 358/506; 358/505; 358/525
[58] Field of Search .................................. 358/505, 506, 358/525, 409, 410, 413, 487; 250/559.02, 559.01, 559.03, 559.11

[56] References Cited

U.S. PATENT DOCUMENTS

| | | | |
|---|---|---|---|
| 4,270,141 | 9/1981 | Sakamoto | 358/78 |
| 4,631,598 | 12/1986 | Burkhardt et al. | 358/280 |
| 4,875,099 | 10/1989 | Sakai et al. | 358/213 |
| 4,907,089 | 3/1990 | Yamaguchi et al. | 358/213.31 |
| 4,922,335 | 5/1990 | Outa et al. | 358/80 |
| 5,012,333 | 4/1991 | Lee et al. | 358/80 |
| 5,121,195 | 6/1992 | Seki et al. | 358/75 |
| 5,416,611 | 5/1995 | Tandon | 358/474 |
| 5,559,553 | 9/1996 | Bitek | 348/312 |
| 5,703,700 | 12/1997 | Birgmeir et al | 358/487 |

*Primary Examiner*—Jerome Grant, II
*Assistant Examiner*—Kevin C. Kianni
*Attorney, Agent, or Firm*—Francis H. Boos, Jr.

[57] ABSTRACT

In a photographic film scanner having a film transport drive stepper motor, an illuminant head having a plurality of spectrally separate light source, a light sensor and data collection and transfer circuits, each operationally responsive to a programmed controller. The controller is provided with a common timer and is programmed with a plurality of lookup tables (LUT), each LUT is populated with a sequence of elements defining timing of an operating activity in a respective one of the illuminant head light sources, the stepper motor and the light sensor data transfer circuits. The program operates to use the common timer to step synchronously through the elements of the LUTs to output value states from the elements of each of the LUTs; to control the actuation timing of the respective light sources, stepper motor and data collection and transfer circuits.

6 Claims, 9 Drawing Sheets

DATA CONTROL LUT 92

R1,0,0,0,0,0,0,0,0,0,0,0,0,0,0,0,0,0,0,0,0,0,0,0,0,0,0,0,0,0,0,0 ⎫
B1,0,0,0,0,0,0,0,0,0,0,0,0,0,0,0,0,0,0,0,0,0,0,0,0,0,0,0,0,0,0,0 ⎬ ONE LINE SCAN CYCLE
G1,0,0,0,0,0,0,0,0,0,0,0,0,0,0,0,0,0,0,0,0,0,0,0,0,0,0,0,0,0,0,0 ⎭
R1,0,0,0,0,0,0,0,0,0,0,0,0,0,0,0,0,0,0,0,0,0,0,0,0,0,0,0,0,0,0,0 ⎫
B1,0,0,0,0,0,0,0,0,0,0,0,0,0,0,0,0,0,0,0,0,0,0,0,0,0,0,0,0,0,0,0 ⎬ ONE LINE SCAN CYCLE
G1,0,0,0,0,0,0,0,0,0,0,0,0,0,0,0,0,0,0,0,0,0,0,0,0,0,0,0,0,0,0,0 ⎭

FIG. 5(b)

RED LED LUT 93

0,0,0,0,0,0,0,0,0,0,0,0,0,0,0,0,1,1,1,1,1,1,1,1,0,0,0,0,0,0,0,0 ⎫
0,0,0,0,0,0,0,0,0,0,0,0,0,0,0,0,0,0,0,0,0,0,0,0,0,0,0,0,0,0,0,0 ⎬ 1ST RED LINE INTEGRATION
0,0,0,0,0,0,0,0,0,0,0,0,0,0,0,0,0,0,0,0,0,0,0,0,0,0,0,0,0,0,0,0 ⎭
0,0,0,0,0,0,0,0,0,0,0,0,0,0,0,0,1,1,1,1,1,1,1,1,0,0,0,0,0,0,0,0 ⎫
0,0,0,0,0,0,0,0,0,0,0,0,0,0,0,0,0,0,0,0,0,0,0,0,0,0,0,0,0,0,0,0 ⎬ 2ND RED LINE INTEGRATION
0,0,0,0,0,0,0,0,0,0,0,0,0,0,0,0,0,0,0,0,0,0,0,0,0,0,0,0,0,0,0,0 ⎭

FIG. 5(c)

BLUE LED LUT 94

0,0,0,0,0,0,0,0,0,0,0,0,0,0,0,0,0,0,0,0,0,0,0,0,1,1,1,1,1,1,1,1 — 2ND BLUE LINE INTEGRATION
0,0,0,0,0,0,0,0,0,0,0,0,0,0,0,0,0,0,0,0,0,0,0,0,1,1,1,1,1,1,1,1 ⎫ 1ST BLUE LINE INTEGRATION
0,0,0,0,0,0,0,0,0,0,0,0,0,0,0,0,0,0,0,0,0,0,0,0,0,0,0,0,0,0,0,0 ⎭
0,0,0,0,0,0,0,0,0,0,0,0,0,0,0,0,0,0,0,0,0,0,0,0,1,1,1,1,1,1,1,1 ⎫ 2ND BLUE LINE INTEGRATION
0,0,0,0,0,0,0,0,0,0,0,0,0,0,0,0,0,0,0,0,0,0,0,0,0,0,0,0,0,0,0,0 ⎭

FIG. 6B

| STEPPER MOTOR PULSES PER SCAN LINE | LINES PER FRAME SCAN |
|---|---|
| 3 | 2625 (HIGH RES) |
| (4.5) | 1750 (MEDIUM RES) |
| 9 | 875 (LOW RES) |

FIG. 7

STEPPER MOTOR LUT (HIGH RES)
```
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
```
—96

FIG. 8(a)

STEPPER MOTOR LUT (MED RES)
```
0,0,0,0,0,0,0,0,0,1,0,0,0,0,0,0,1,0,0,0,0,0,0,0,0,0,0,0,0,0
0,0,0,0,0,0,0,0,0,0,0,0,0,0,0,0,1,0,0,0,0,0,0,0,0,0,0,0,0,0
0,0,0,0,0,0,0,0,0,1,0,0,0,0,0,0,1,0,0,0,0,0,0,0,0,0,0,0,0,0
0,0,0,0,0,0,0,0,0,0,0,0,0,0,0,0,1,0,0,0,0,0,0,0,0,0,0,0,0,0
0,0,0,0,0,0,0,0,0,1,0,0,0,0,0,0,1,0,0,0,0,0,0,0,0,0,0,0,0,0
0,0,0,0,0,0,0,0,0,0,0,0,0,0,0,0,1,0,0,0,0,0,0,0,0,0,0,0,0,0
```
—97

FIG. 8(b)

STEPPER MOTOR LUT (LOW RES)
```
0,0,0,0,0,0,0,0,1,0,0,0,0,0,0,1,0,0,0,0,0,0,1,0,0,0,0,0,0,0
0,0,0,0,0,0,0,0,1,0,0,0,0,0,0,1,0,0,0,0,0,0,1,0,0,0,0,0,0,0
0,0,0,0,0,0,0,0,1,0,0,0,0,0,0,1,0,0,0,0,0,0,1,0,0,0,0,0,0,0
0,0,0,0,0,0,0,0,1,0,0,0,0,0,0,1,0,0,0,0,0,0,1,0,0,0,0,0,0,0
0,0,0,0,0,0,0,0,1,0,0,0,0,0,0,1,0,0,0,0,0,0,1,0,0,0,0,0,0,0
0,0,0,0,0,0,0,0,1,0,0,0,0,0,0,1,0,0,0,0,0,0,1,0,0,0,0,0,0,0
```
—98

FIG. 8(c)

METHOD AND APPARATUS FOR CONTROLLING IMAGE SCANNING AND DATA TRANSFER IN A PHOTOGRAPHIC FILM SCANNER

FIELD OF THE INVENTION

The invention relates generally to the field of photographic film scanners and, more particularly, to method and apparatus for controlling image data collection and data transfer to a host computer.

BACKGROUND OF THE INVENTION

Photographic film scanners are known in which image frames on a strip of photographic film are scanned to convert the optical image frames into digital image data which can be stored and manipulated in a computer and, at the user's option, sent to a digital printer for generating hardcopy image prints. It is common in such scanners, to scan the image frame by transporting the film strip through an optical imaging path in which an exposure light source is shone through the image and focussed onto a linear CCD sensor to capture the image information one scan line at a time. The exposure light source may comprise a linear, interleaved array of spectrally distinct light emitting diodes (LED), for example, emitting in the red, blue and green spectra. In order to achieve accurate color rendition in the scanner it is necessary to perform a calibration of the LED exposure lights primarily to equalize the light outputs of the respective red, blue and green LED's. The analog pixel-by-pixel image information captured on the linear CCD light sensor must be clocked out of the CCD, digitized, processed and transferred to a host computer in synchronism with the transport motion of the film in such a manner that the transferred data is accurate and that no data is lost as a result of asynchronous operation between the scanner and the host computer. Internal operations of the scanner typically involve the use of separate timers to control the light source, film transport motor drive and data clocking/transfer functions, which require complex synchronizing provisions for control of the separate timers. Changing the scanning resolution complicates the control procedure as does changing the operating conditions of the R, B, G exposure light sources to accommodate for system drift and differing density characteristics among different film strips. It is an objective of the present invention to provide a simple and effective control method and apparatus for operating a film scanner that simplifies the synchronizing of the various operating functions and also simplifies implementation of changes in operating conditions of the scanner.

SUMMARY OF THE INVENTION

In accordance with one aspect of the invention a method of controlling image data collection and image data transfer in a photographic film scanner operating under the control of a microprocessor controller is provided wherein the method comprises providing a plurality of lookup tables (LUT) in the controller, each LUT being populated with a sequence of elements defining an operating activity in a respective one of (a) transfer out of the scanner of a line of collected image data, (b) on/off operation of one or more scanning exposure light sources and (c) on/off operation of a film transport drive stepper motor; using a common timer to step synchronously through the elements of the LUTs to output value states from the elements of each of the LUTs; and responding to the synchronously outputted value states from the respective LUT to effect actuation of the data transfer, LED and drive motor operations in accordance with the value states of the LUT elements. There are advantages to the use of LUTs to control the described operations of the scanner. The use of a single timer simplifies the synchronization of the various operations.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
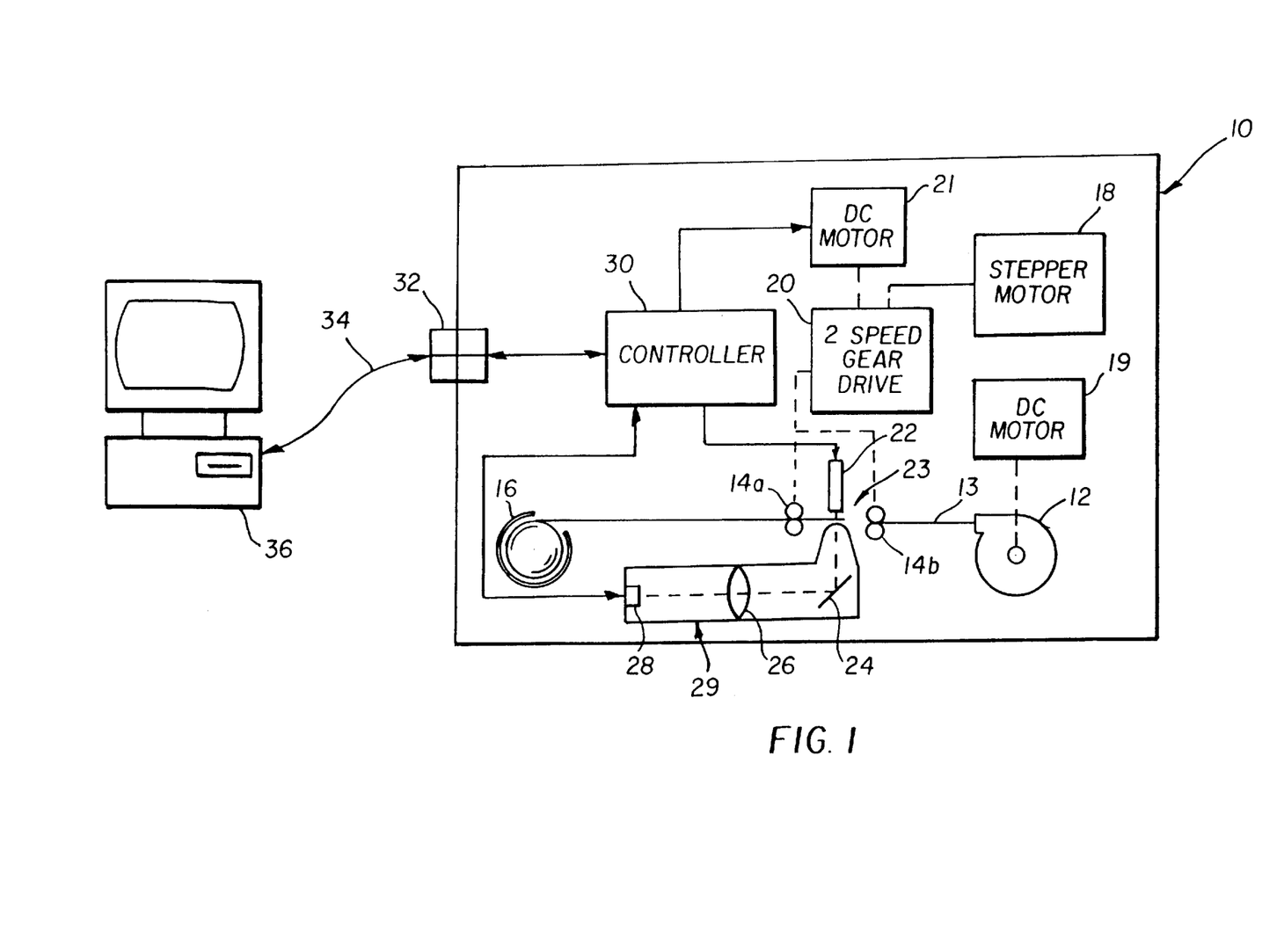
FIG. 1 is a functional block diagram of relevant hardware features of a photographic film scanner embodying the present invention.

In FIG. 1, a film scanner 10 is shown schematically. A film supply cartridge 12 from which a processed film strip 13 extends through a film transport mechanism, comprising a pair of nip rollers 14a, 14b driven by a stepper motor 18, to a film takeup chamber 16. A dc motor 19 couples with the spool of the film supply cartridge to initially thrust the film strip from the cartridge to the nip rollers and later to drive the cartridge spool in the reverse direction in the course of rewinding the film back into the cartridge. The stepper motor 18 is coupled to the nip rollers by way of a two-speed gear drive mechanism 20. A dc motor 21 is connected to the gear drive mechanism to perform shifting between a high and low speed operations. The high speed operation is used for advancing the film in a forward direction between image frames and in the reverse direction during film rewind. The low speed operation is used in the forward direction during scanning of an image frame on the film. The scan line resolution for a particular image scan operation is selected by controlling the step rate of the stepper motor 18.

The space between the nip rollers 14a, 14b comprises a film scan imaging gate 23. This scan gate accommodates an imaging channel which includes an illuminant head 22 and an imaging assembly 29. In a preferred embodiment of the invention, the illuminant head 22 comprises a linear array of interleaved, spectrally separated LED light sources emitting light respectively in the red, blue and green spectra for transmission through the film image frame in the scan gate. By separately controlling the ON times of the red, blue and green LEDs the proper amount of light for each color is sent through the film to achieve a balanced color image from the film. The imaging assembly 29 comprises a mirror 24, a focussing lens 26 and a linear light sensor 28 for imaging the light transmitted through the film onto the linear light sensor. In the preferred embodiment being described herein, the light sensor 28 is preferably a trilinear CCD sensor of known construction having suitable red, blue and green filters to render the individual linear sensors separately responsive to the red, blue and green LED illuminants from the illuminant assembly.

A programmed controller 30 is provided to control the overall operation of the scanner. This includes connections to each of the motors to control the motor functions described above. In addition, the controller 30 is coupled to illuminant head 22, CCD sensor 28 and, via host interface 32 and cable 34, to a host computer 36 and operates to control the timing and processing of data output from the CCD sensor 28, the timing of data transfer to the host computer and the ON/OFF timing of the LED light sources in illuminant head 22. In accordance with the invention, a novel scanning algorithm is employed to collect the image data from the film by controlling CCD timing, to set the LED ON/OFF timing, the stepper motor timing and the timing of data transfer to the host interface, all through the medium of multiple software lookup tables (LUTs) operating from a common timing counter arrangement. Additionally, multiple LUTs can be used on a selective basis by the controller, again using the common timer, to set the step rate of the stepper motor 18 for any given image scan to thereby set the scan line resolution of image data for the film image frame being scanned.

Figure 2:
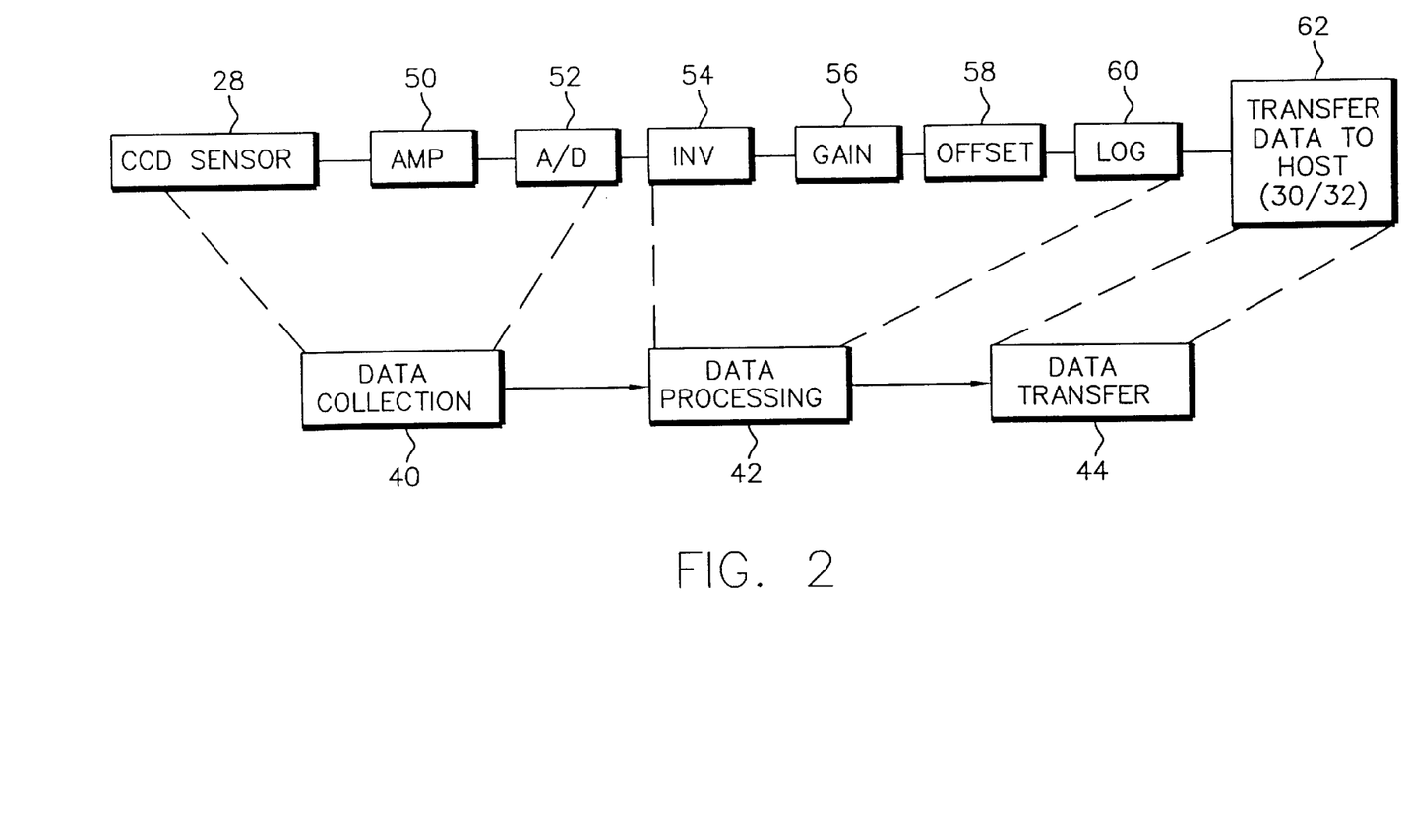
FIG. 2 is a functional block diagram of the image data collection, processing and transfer channel of the film scanner controller.

FIG. 2 shows, in functional block diagram form, a conventional signal channel employed in the scanner of FIG. 1 to perform the primary functions of image data collection 40, data processing 42 and data transfer 44 to a host computer 36, all under the control of the controller 30. As shown in the drawing, the data collection function 40 involves the CCD sensor 28, an analog signal amplifier 50 and an A/D converter 52 to convert the analog signal from the CCD sensor into digital data values. The data processing function 42 involves processing of the digital data from the A/D an inverter 54, gain and offset correction by units 56 and 58 and a linear to log conversion by unit 60. The data transfer function 44 is represented by unit 62 and involves transfering the collected data via the interface unit 32 at an appropriate time when the host computer is prepared to receive the data. The appropriate time is determined by what is known in the art as establishing a "handshake" between the computer 36 and the controller 30 via interface 32.

Figure 3:
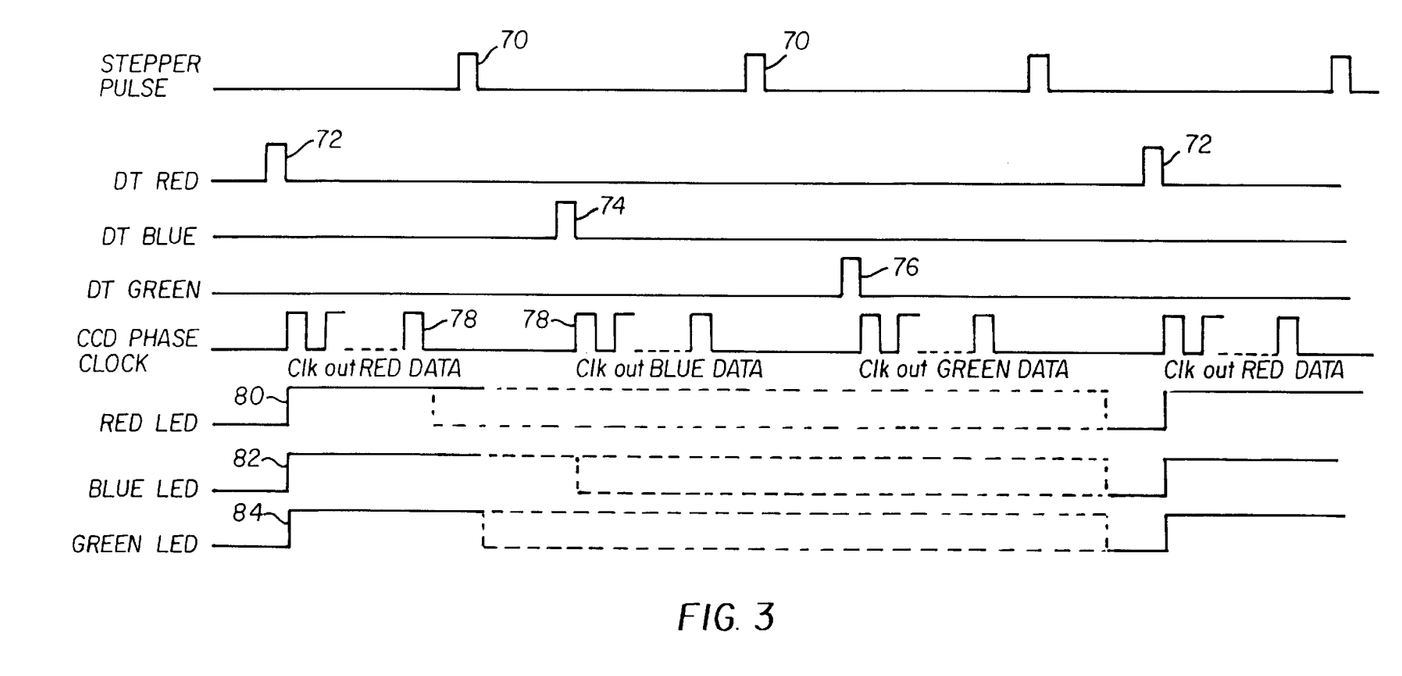
FIG. 3 is a timing diagram used in explaining the operation of the invention.

The timing diagram of FIG. 3 illustrates the timing relationships of the various functions described above that are controlled by the algorithm of the invention, namely the stepper motor drive, data transfer and data collection. Pulses 70 represent the stepper motor timing pulses that determine the scan line resolution in the frame scan direction, that is, in the direction in which the film is transported through the frame scan gate. As will be seen, the illustrated pulses are for a high resolution scan (1500 pixels by 2625 scan lines). A lower scan line resolution would involve additional stepper motor timing pulses. Pulses 72, 74, 76 represent timing pulses which initiate data transfer from the scanner to the host computer of each of the red, blue and green color lines of data, respectively, previously clocked out from the CCD sensor 28 ("data collection", "data processing"). Three color lines of pixel data in the cross scan direction correspond to a single scan line in the frame scan direction. The CCD phase clock waveform shows the timing pulses 78 sent to the CCD to clock out the red, blue and green linear sensors ("data collection"). The high states of the red LED, blue LED and green LED waveforms 80, 82, 84 represent the selectively variable ON times of the red, blue and green LED's, respectively, in the illuminant head 22.

Figure 4:
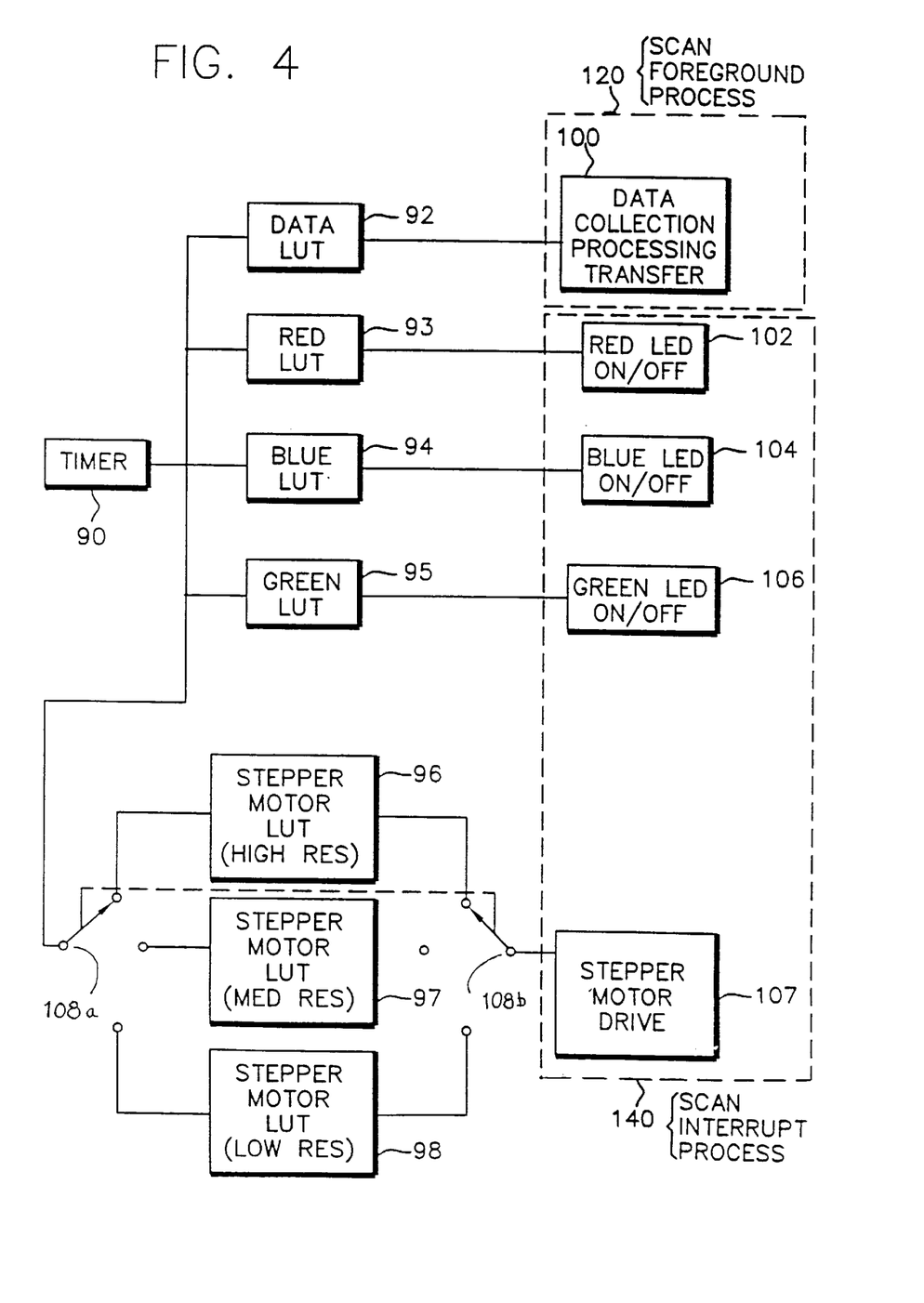
FIG. 4 is a functional block diagram illustrating the hardware and software operating features of the present invention.

FIGS. 4 shows, in block diagram form, the functional operations performed in accordance with the invention using a common timer 90 to step through the data arrays of each of a plurality LUTs, data transfer LUT 92 and LED LUTs 93–95 as well as one of the stepper motor LUTs 96–98, with each LUT operationally controlling the timing its respective operating function. Data transfer LUT 92 outputs the timing pulses which initiate the data collection, processing and transfer functions of block 100. These functions of block 100 correspond to the Scan Foreground Process 120 in the controller 30 operating program to be described subsequently in reference to FIG. 6A. Red, blue and green ON/OFF LUTs 93–95 output timing pulses that set the ON/OFF states of the red, blue and green LED light elements 102, 104, 106 located in the illuminant head 22. A plurality of stepper motor LUTs 96, 97 and 98 provided, one of which is selected by the operating program, as represented graphically by switches 108a, 108b, to output timing pulses that control stepper motor drive 107 to control the advance of the film through the scan gate during the frame scanning operation and thereby control the scan line resolution of the frame scan. The functions of blocks 102, 104, 106 and 107 make up the Scan Interrupt Process 140 of the controller operating program as shown in FIG. 6B.

Referring now to FIGS. 5(a)–5(e), there are shown the data array contents of each of the LUTs 92–95 and the High Res. stepper motor LUT 96 of FIG. 4. Each array is 180 elements long comprised of two repeating sets of three color lines (red, blue and green) of 30 elements each. The first element of each array is represented in the upper left corner and the last element (no. 180) is represented in the lower right corner. Three color lines make up one frame scan line and thus each LUT array is two scan lines long. While the invention may be practiced with LUTs that are only a single scan line long, a LUT of two scan lines in length is used in the illustrated embodiment for reasons which will be explained in more detail later. The timer 90 (FIG. 4) generates timing counter pulses, shown in FIG. 5(f), that step through all the array elements of the data timing, LED and stepper motor LUTS in synchronism to output function controls dependent on the binary values of the array at each element position.

Figure 5A:
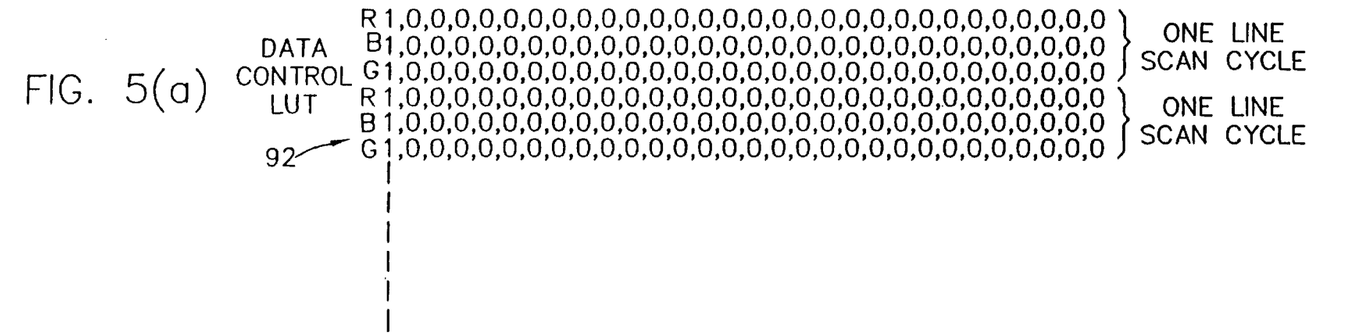
FIGS. 5(a)–5(e) are lookup table (LUT) charts used for control of data collection and transfer, LED on control and control of stepper motor operation in accordance with the present invention.
Figure 5B:
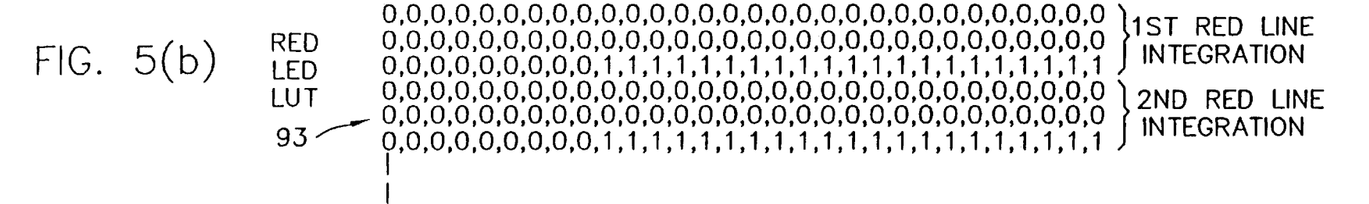
Figure 5C:
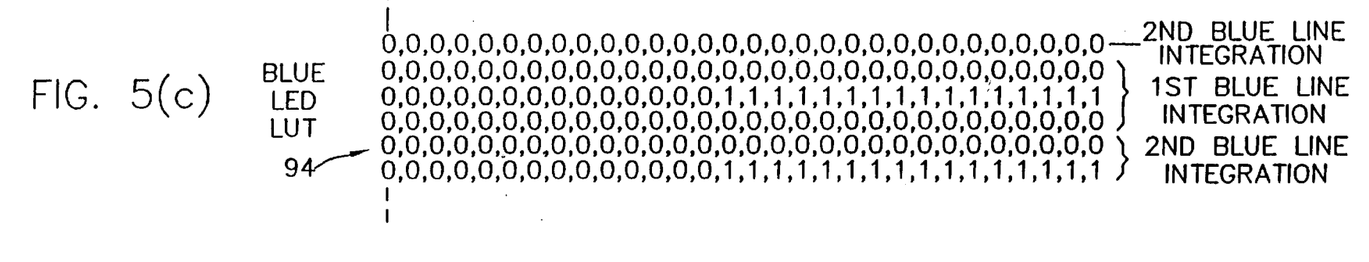
Figure 5D:
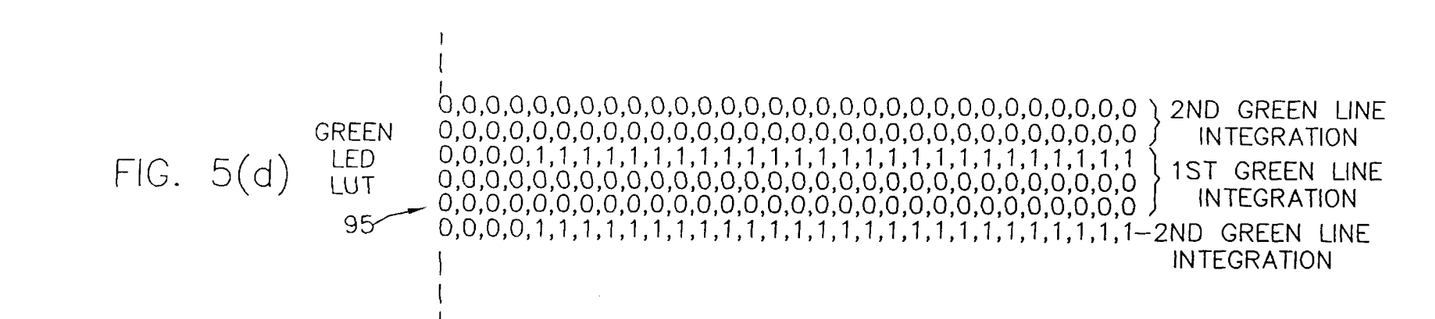
Figure 5E:
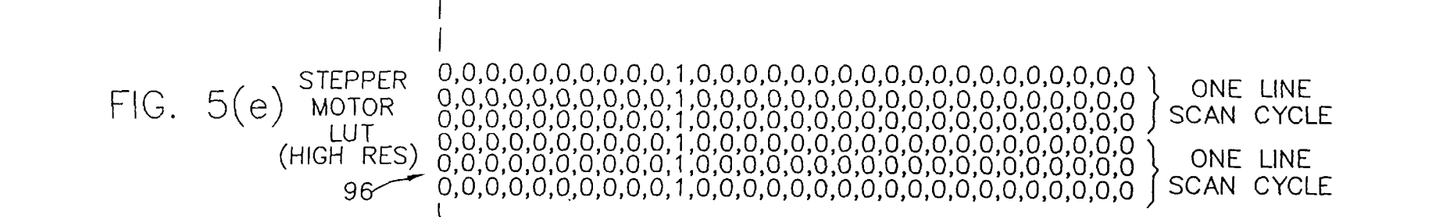

The data control LUT array of FIG. 5(a) contains a binary "1" value at the beginning of each color line to initiate the collection, processing and transfer to the host computer of a line of color data accumulated in the CCD during a previous CCD integration time period. The LED LUTs in FIGS. 5(b)–5(d) each contain binary values that determine the ON and OFF times of the LED light sources in illuminant head 22. The convention for the binary values in these LUTs is that a "0" value corresponds to an ON condition of the LEDs and a "1" value corresponds to an LED OFF condition. It may be noted from the LED LUT arrays 93–95 that they all start at position zero turning on the respective LED and at some point within the first 90 elements, the LED is turned off. The integration period for blue and green does not line up with the first element of the LED LUT array. Integration for a particular color occurs for the entire time between data transfer pulses, the DT pulses 72, 74 and 76 in FIG. 3, for each of the colors. Only for the red channel does the turning on of the LED's align with the transfer of the red information to the host. For the blue and green channels there is a ⅓ and ⅔ phase shift from when the lights are turned on to when the data is transferred. However this is acceptable since the modulus nature of the lookup tables ensures that the total on time needed for a particular color is always maintained. The stepper motor LUT of FIG. 5(e) issues a step command, indicated by a binary "1" value during the course of each line of color integration in the CCD thereby setting the image frame's scan line resolution in the frame scan direction. The resolution represented by the six "1" elements in the LUT 96 of FIG. 5(e) corresponds to high resolution frame scan.

Figure 5F:
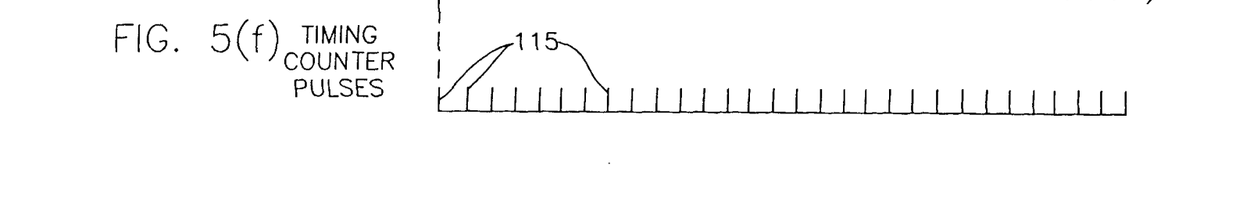
FIG. 5(f) shows the common timer counter pulses used to step through the LUTs of FIGS. 5(a)–5(e)
Figure 6:
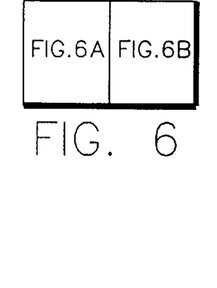
FIGS. 6A and 6B is a flow chart for the program employed in the scanner controller in accordance with an embodiment of the invention.
Figure 6A:
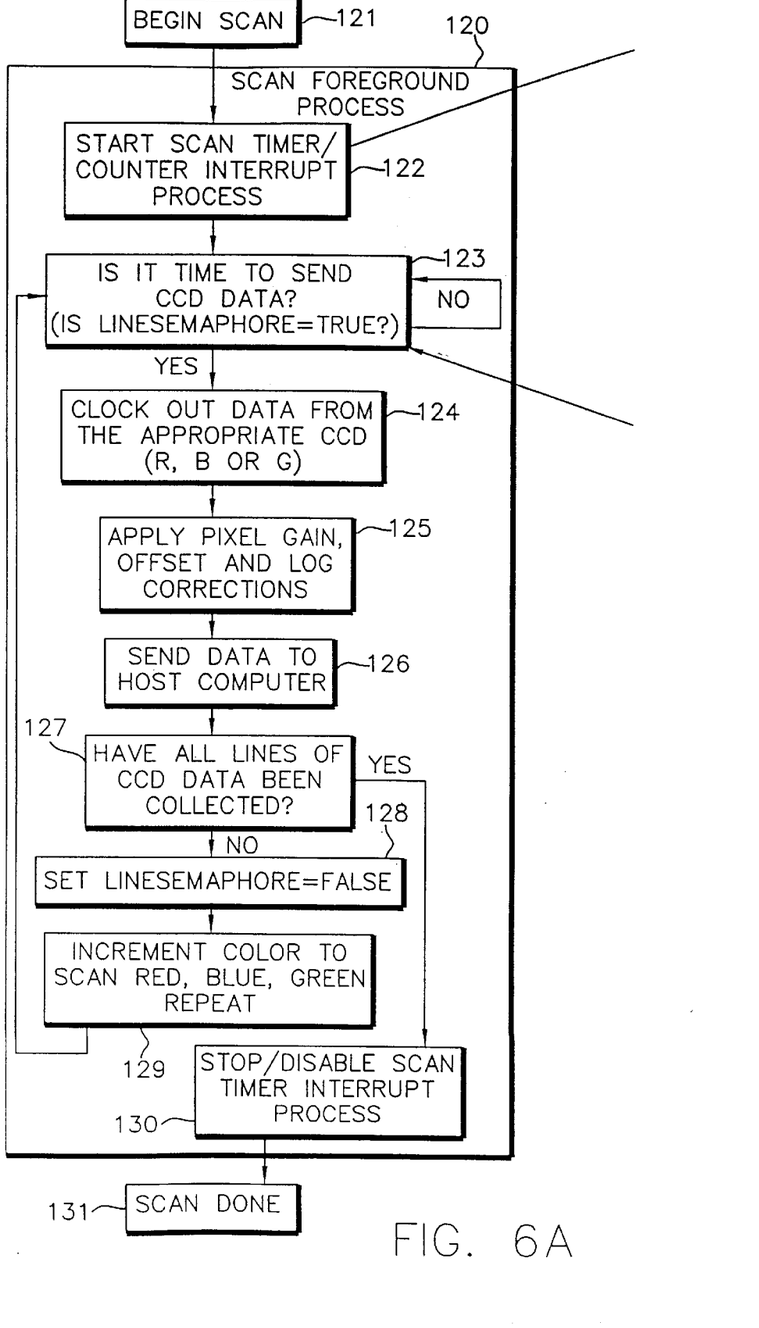
Figure 6B:
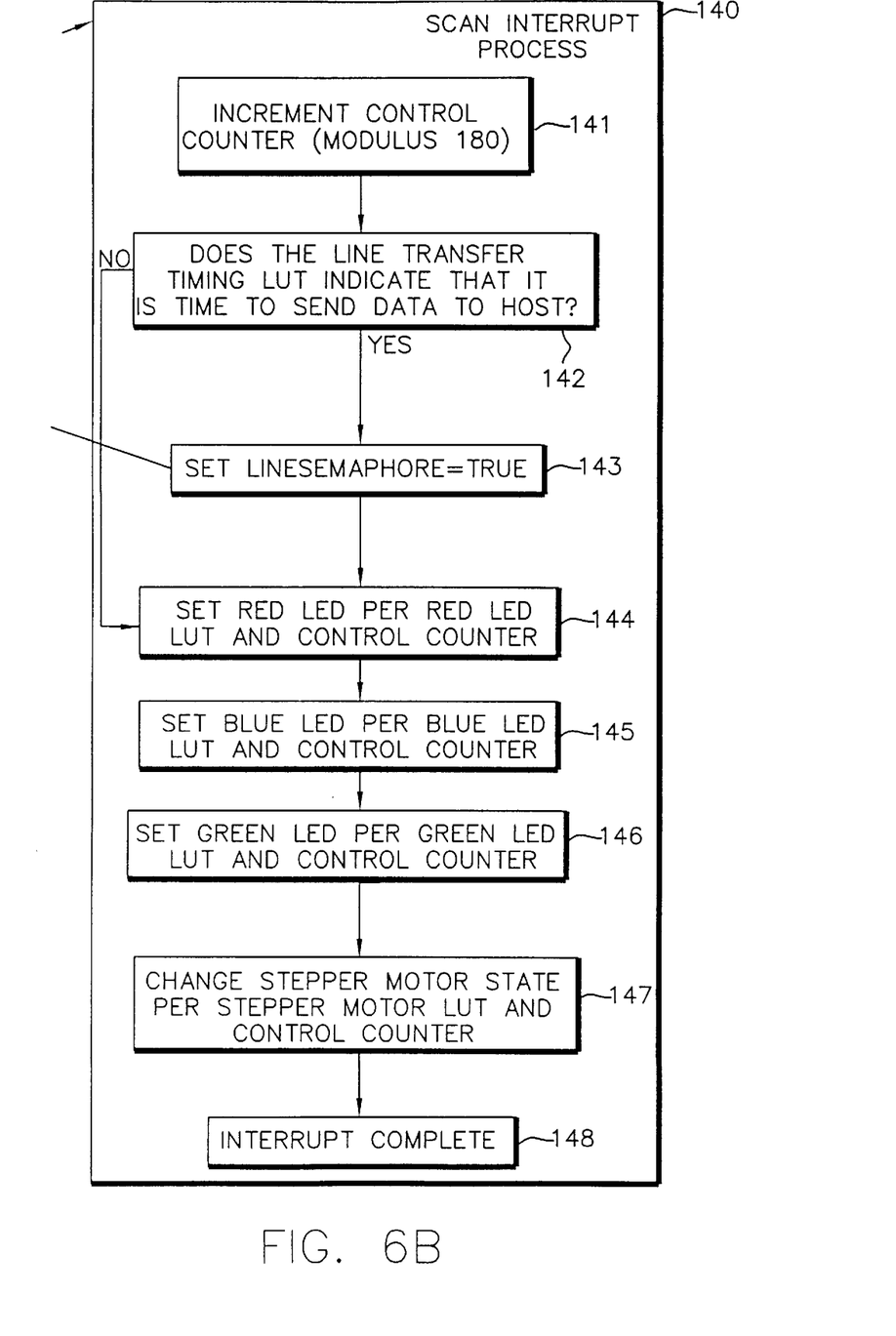

Turning now to program flow chart of FIG. 6, step 121 begins a scan process in response to each occurrence of a timer pulse 115 (FIG. 5(f)). The scan process comprises a Scan Foreground Process 120 and Scan Interrupt Process 140 which operate independently. When the scan foreground process begins, step 122 initiates the scan interrupt process to run for one complete cycle. After initiating the scan interrupt process, the scan foreground process moves to step 123 where it remains until a "LineSemaphore=True" flag is set by the interrupt process. This flag indicates that it is time to collect and transfer a line of color data from the CCD to the host computer. When step 123 detects this flag, the foreground process moves to step 124 to clock a line of color data (red, blue or green) out of the appropriate CCD sensor, then to step 125 in which the data is processed (pixel gain, offset and log correction) and then to 126 which effects transfer of the data to the host computer. Step 127 determines if the frame scan has been completed and, if not, the process moves to step 128, which sets the Line Semaphore flag to "false", and then to step 129 which increments a color scan counter to the next color to be scanned. After this, the process returns to step 123 to await the next "LineSemaphore=True" flag. If step 127 determines that the image frame scan is complete, the process branches to steps 130 and 131 which stop the scan processes until a new image frame scan command is received from the host computer.

Considering now the scan interrupt process 140, each time the process is initiated in response to an occurrence of the timer pulse 115, step 141 increments a control counter (modulus 180) to keep track of the element position within the LUT arrays. Step 142 then checks the element value in the Data Transfer LUT 110 and, if it is a "1", step 143 sets the "LineSemaphore=True" flag to enable the foreground process to start the data collection and transfer operation described above. If LUT 10 returns a "0" value, the flag setting step is bypassed. The interrupt process then moves through each of steps 144–146 to set the LED ON/OFF conditions in accordance with the element values returned from LED LUTs 111–113, respectively. After this, the process moves to step 147 which checks stepper motor LUT 114, assuming the scanner is set to high resolution scan, to advance the film one step each time an element value "1" is returned from the LUT. Following this, the process moves to step 148 which stops the interrupt process pending receipt of another start command in response to the next timer pulse 115.

Figure 7:
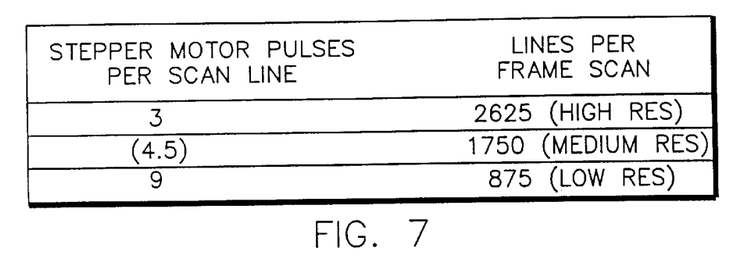
FIG. 7 is a table showing the relationship between stepper motor pulses and image frame scan line resolution for one embodiment of the invention.
Figure 8A:
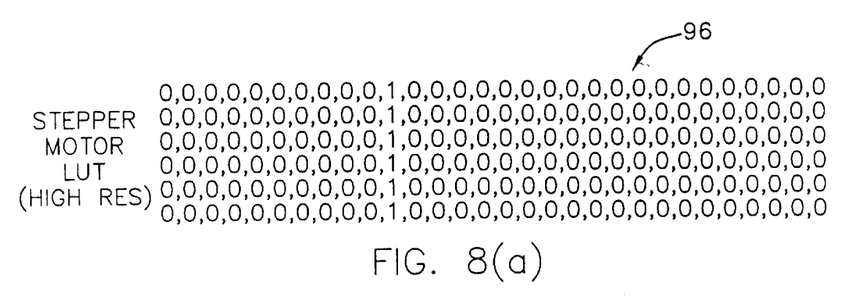
FIGS. 8(a)–8(c) are LUT charts for controlling the stepper motor to achieve the frame scan resolutions of FIG. 7.
Figure 8B:
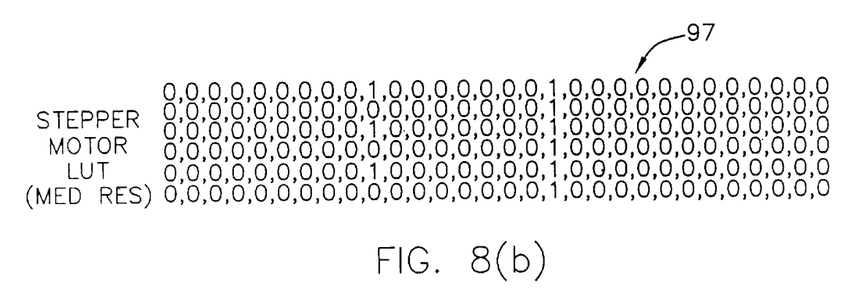
Figure 8C:
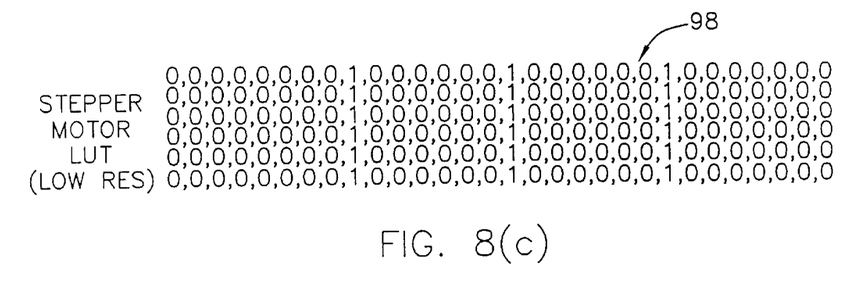

Referring now to FIGS. 7 and 8 (a)–8(c), it will be recalled from the discussion of FIG. 4 that the scan line resolution for an image frame scan can be selected by merely choosing from a plurality of available stepper motor LUT arrays 96–98. FIG. 7 shows a chart correlating the number of stepper motor pulses per scan line to the corresponding image frame scan line resolution for an actual embodiment of the invention. FIGS. 8(a)–8(c) show the array contents for each of the LUTs 96–98 corresponding to the high, medium and low frame scan line resolutions, respectively. For the particular embodiment disclosed herein, frame scan line resolutions of 2625 lines (high res.), 1750 (med. res.) and 875 (low res.) are available. These resolutions translate to 3, 4.5 and 9 motor steps per scan line, respectively. Since it is not possible to have a one-half motor step pulse, the LUT arrays are all arranged to be two scan lines in length (180 array elements). In this way, as seen in LUT array 97, the odd step pulse requirement is readily accommodated by the use of nine "1" elements spaced within the two scan line array of the stepper motor medium resolution LUT 97. LUT arrays 96 and 98 simply repeat the same "1" pattern in both scan line segments. The pixel line scan direction is set to interpolate the pixels in each scan line to achieve a constant 1.75 image aspect ratio in the data for any scan resolution. For high resolution, there is no pixel interpolation since in the pixel line scan direction there are 1500 pixels of CCD data across the image and the ratio of 2625 to 1500 is 1.75. For medium resolution, the 1500 pixels is interpolated in known manner down to 1000 pixels and, for low resolution, the pixel data is interpolated down to 500 pixels.

It will be appreciated that what has been described is a simple and convenient method and apparatus for control timing of critical operating functions in an image scanner. The use of a plurality of lookup tables provides flexible, independent control of the integration periods of the three different color planes.

The invention has been described in detail with particular reference to certain preferred embodiments thereof, but it will be understood that variations and modifications can be effected within the spirit and scope of the invention. For example, the LUT-based operating program is described as being resident in the film scanner internal controller. It will be appreciated that the program may equally well comprise an application program resident entirely on the host computer to which the scanner is connected or divided between the host computer and a controller internal to the film scanner and the term microprocessor controller used herein is intended to refer to either or both an internal scanner controller and a host computer.

| PARTS LIST | |
|---|---|
| 10 | film scanner |
| 12 | film cartridge |
| 13 | processed film strip |
| 14a,b | nip rollers |
| 16 | film takeup chamber |
| 18 | stepper motor |
| 19 | dc motor |
| 20 | two speed gear drive mechanism |
| 21 | dc motor |
| 22 | illuminant head |
| 23 | imaging gate |
| 24 | mirror |
| 26 | focussing lens |
| 28 | linear light sensor |
| 29 | imaging assembly |
| 30 | controller |
| 32 | host interface |
| 34 | cable |
| 36 | host computer |
| 50 | amplifier |
| 52 | A/D converter |
| 54 | inverter |
| 56 | gain corrector |
| 58 | offset corrector |

-continued

PARTS LIST

| | |
|---|---|
| 60 | linear to log converter |
| 90 | timer |
| 92 | data transfer LUT |
| 93–95 | LED LUTs |
| 96–98 | stepper motor LUTs |
| 100 | data transfer block |
| 102 | red LED driver |
| 104 | blue LED driver |
| 106 | green LED driver |
| 107 | stepper motor driver |
| 120 | scan foreground process |
| 140 | scan interrupt process |

What is claimed is:

1. A method of controlling image data collection and image data transfer in a photographic film scanner operating under the control of a digital controller, the method comprising:

providing a plurality of lookup tables (LUT) in the controller, each LUT populated with a sequence of elements defining timing of an operating activity in a respective one of (a) transfer out from the scanner of a line of collected image data, (b) on/off operation of one or more scanning exposure light sources and (c) step operation of a film transport drive stepper motor;

using a common timer to step synchronously through the elements of the LUTs to output value states from the elements of each of the LUTs; and responding to said synchronously outputted value states from said LUTs to effect timing of actuation of said data transfer, LED and film transport drive stepper motor operations in accordance with said value states of the LUT elements.

2. The method of claim 1 wherein said plurality of LUTs includes a plurality of stepper motor timing LUTs, each defining a different scan line resolution; the method further comprising selecting one of said plurality of stepper motor LUTs corresponding to a desired scan line resolution for use in response to said common timer in effecting timing actuation of said stepper motor operation.

3. The method of claim 2 further including interpolating pixel line scan data from said sensor in coordination with selection of said one stepper motor LUT to maintain image aspect ratio at a predetermined ratio when changes in scan line resolution are made.

4. Apparatus for controlling image data collection and image data transfer in a photographic film scanner, the apparatus comprising:

a film scan gate;

a film transport drive stepper motor for advancing film through said scan gate during an image frame scan operation;

an illuminant head having an array of spectrally separated light sources;

a light sensor;

light sensor data transfer circuits for collecting and transferring light sensor data to a host computer; and a controller having a common timer and programmed with a plurality of lookup tables (LUT), each LUT populated with a sequence of elements defining timing of an operating activity in a respective one of said illuminant head light sources, said stepper motor and said light sensor data transfer circuits, said program operating to use said common timer to step synchronously through the elements of the LUTs to output value states from the elements of each of the LUTs;

wherein said illuminant head light sources, said stepper motor and said light sensor data transfer circuits are individually responsive to said outputted value states from said LUTs to effect timing of actuation of said data transfer, light sources and stepper motor operations in accordance with said value states of the LUT elements.

5. Apparatus according to claim 4 wherein said plurality of LUTs includes a plurality of stepper motor timing LUTs, each defining a different scan line resolution and said controller program operates to select one of said plurality of stepper motor LUTs corresponding to a desired scan line resolution for use in response to said common timer in effecting timing actuation of said stepper motor operation.

6. Apparatus according to claim 5 wherein said controller program is further operative to interpolate pixel line scan data from said light sensor in coordination with selection of said one stepper motor LUT to maintain image aspect ratio at a predetermined ratio when changes in scan line resolution are made.

* * * * *